United States Patent Office.

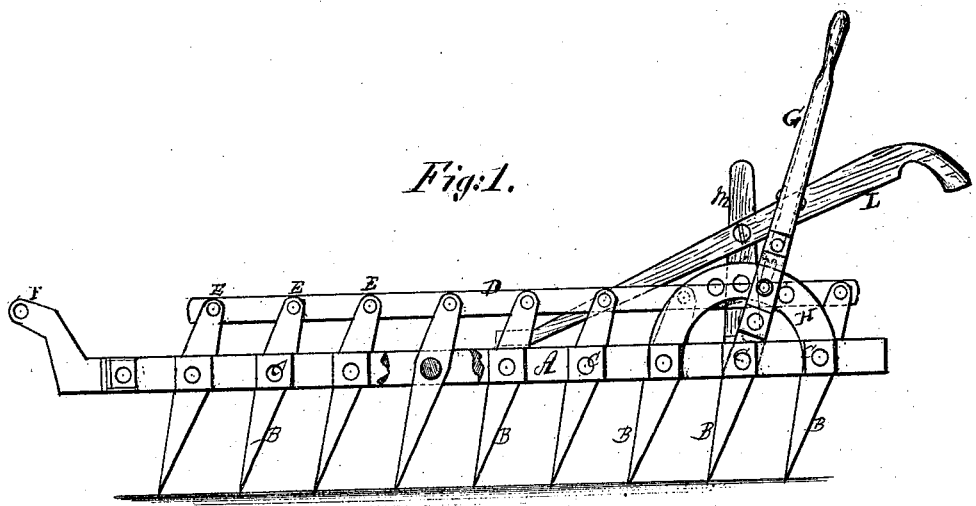
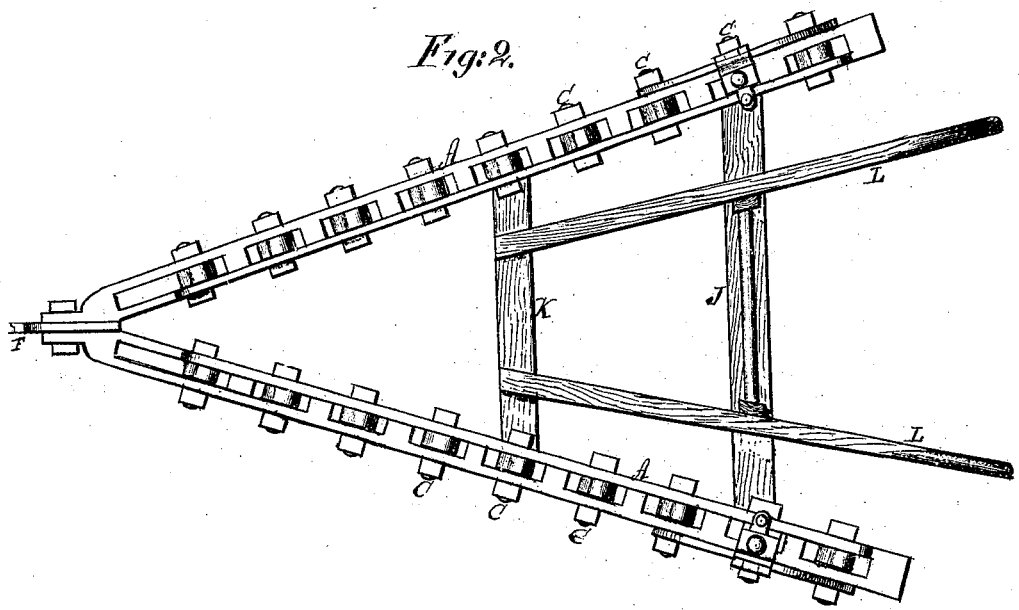

P. S. GRAVES AND P. B. PARCELL, OF ASHMORE, ILLINOIS.

Letters Patent No. 95,467, dated October 5, 1869.

IMPROVEMENT IN HARROWS.

The Schedule referred to in these Letters Patent and making part of the same.

*To all whom it may concern:*

Be it known that we, P. S. GRAVES and P. B. PARCELL, of Ashmore, in the county of Coles, and State of Illinois, have invented a new and useful Improvement in Harrows; and we do hereby declare that the following is a full, clear, and exact description thereof, which will enable others skilled in the art to make and use the same, reference being had to the accompanying drawings, forming part of this specification.

Our invention relates to an improvement in harrows which have reversible teeth; and consists in a certain combination, construction, and arrangement of parts, which will be more particularly described hereafter.

In the accompanying sheet of drawings—

Figure 1 represents a side elevation of the harrow.

Figure 2 is a top or plan view.

Similar letters of reference indicate corresponding parts.

This harrow is of the common triangular form, with the side-pieces of the frame made of iron, connected together at the forward end.

A A represent the side-pieces which contain vertical mortises for receiving the teeth B.

In these mortises the teeth are pivoted or jointed by bolts or pins at the points C, so that they are allowed to turn freely on the pins or bolts.

The teeth extend about one-third of their length above the frame, and their upper ends are jointed to the rails D at the points E, so that by giving the rails D, or either of them, a longitudinal motion in either direction, the teeth will be thrown forward or back, as may be desired.

As seen in fig. 1, the points of the teeth are thrown slightly forward, so as to feed into or take the ground, the harrow being drawn from the point F.

By the movement of the bars D back or forward longitudinally, the teeth will be made to stand at an angle of, say, forty-five degrees, more or less.

When the points of the teeth are thrown back, they will not of course penetrate the ground, and the harrow may be drawn over the ground with ease to or from the field.

By varying the position of the teeth from the perpendicular, they may be made to take to the ground as much or as little as may be desired.

The bars D are operated or thrown longitudinally back and forth by means of levers G, which, in this example of our invention, are formed by extending a tooth upward on each side of the harrow. The bars D are connected with the levers G, the fulcrum of the levers being at the points C.

The lever is held in position by means of a circular bar, H, which is attached to the side of the frame, as seen in fig. 1.

These circles are provided with a series of holes, and on the side of each of the levers there is a spring-bar, with a pin on its lower end, which pin passes through the lever, and enters any hole in the circle, thus governing the position of the lever and the teeth while the circles serve as guides for the levers.

The two sides of the harrow are kept extended by means of transverse wooden bars, J and K, which support the handles L L, by means of the stands m.

When the harrow-teeth are put in with bolts or pins, they or any portion of them may be readily removed, and cultivator-teeth substituted therefor.

The advantages of this method of constructing harrows will be readily understood and appreciated by all agriculturists.

Having thus described our invention,

We claim as new, and desire to secure by Letters Patent—

The combination of a triangular frame, A, and two converging continuous rods, D, with a series of pivoted shifting-lever teeth, arranged at any angle thereto, as shown and described.

P. S. GRAVES.
P. B. PARCELL.

Witnesses:
WM. HAWKINS,
WM. P. GREEN.